United States Patent
Koryakina et al.

(10) Patent No.: US 10,140,145 B1
(45) Date of Patent: *Nov. 27, 2018

(54) DISPLAYING GUEST OPERATING SYSTEM STATISTICS IN HOST TASK MANAGER

(71) Applicant: Parallels IP Holdings GmbH, Schaffhausen (CH)

(72) Inventors: Elena A. Koryakina, Moscow (RU); Alexey B. Koryakin, Moscow (RU)

(73) Assignee: PARALLELS IP HOLDINGS GMBH, Schaffhausen (CH)

( * ) Notice: Subject to any disclaimer, the term of this patent is extended or adjusted under 35 U.S.C. 154(b) by 268 days.

This patent is subject to a terminal disclaimer.

(21) Appl. No.: 15/298,804

(22) Filed: Oct. 20, 2016

Related U.S. Application Data (63) Continuation of application No. 14/953,220, filed on Nov. 27, 2015, now Pat. No. 9,489,220, which is a continuation-in-part of application No. 14/087,023, filed on Nov. 22, 2013, now Pat. No. 9,223,598.

(60) Provisional application No. 61/729,642, filed on Nov. 26, 2012.

(51) Int. Cl.
*G06F 9/455* (2018.01)
*G06F 11/30* (2006.01)
*G06F 11/32* (2006.01)
*G06F 11/34* (2006.01)
*G06F 9/445* (2018.01)

(52) U.S. Cl.
CPC ...... *G06F 9/45558* (2013.01); *G06F 9/44521* (2013.01); *G06F 11/301* (2013.01); *G06F 11/3075* (2013.01); *G06F 11/32* (2013.01); *G06F 11/3409* (2013.01); *G06F 2009/45591* (2013.01)

(58) Field of Classification Search
None
See application file for complete search history.

(56) References Cited

PUBLICATIONS

Petri; Killing a Hung Virtual Machine on Hyper-V; Petri IT Knowledgebase, Oct. 14, 2011 (Year: 2011).*
Abimbola et al; NetHost-sensor: Monitoring a target host's application via system calls; Elsevier Ltd, 2006 (Year: 2006).*

* cited by examiner

*Primary Examiner* — Bing Zhao
(74) *Attorney, Agent, or Firm* — Bardmesser Law Group (57) ABSTRACT

A method for acquiring process statistics includes starting a Virtual Machine (VM) on the host node; renaming a standard DLL that collects process statistics; installing a replacement DLL in a directory of a Task Manager, wherein the replacement DLL has the same name as the standard DLL prior to the renaming; collecting host OS process statistics via the renamed standard DLL; collecting VM process statistics via API calls to the replacement DLL from the Task Manager; and displaying the VM process statistics and the host OS process statistics in the same interface. Optional steps include launching the Task Manager on a host node; saving a link to location of the renamed standard DLL prior to the installing; starting a host process prior to the step of collecting the host OS process statistics, and starting a VM process on the VM prior to the step of collecting the VM process statistics.

18 Claims, 6 Drawing Sheets

DISPLAYING GUEST OPERATING SYSTEM STATISTICS IN HOST TASK MANAGER

CROSS-REFERENCE TO RELATED APPLICATIONS

This application is a continuation of U.S. patent application Ser. No. 14/953,220, filed Nov. 27, 2015, entitled DISPLAYING GUEST OPERATING STATISTICS IN HOST TASK MANAGER, which is a continuation of U.S. patent application Ser. No. 14/087,023, filed Nov. 22, 2013, entitled DISPLAYING GUEST OPERATING STATISTICS IN HOST TASK MANAGER, which is a non-provisional application of U.S. Provisional Patent Application No. 61/729,642, filed Nov. 26, 2012, entitled DISPLAYING GUEST OPERATING STATISTICS IN HOST TASK MANAGER, both incorporated by reference herein in their entirety.

BACKGROUND OF THE INVENTION

Field of Invention

The present invention relates to virtualization technology, and, more particularly to collecting Guest OS statistics by the host OS Task Manager.

Background Art

With Virtual Machine (VM) technology, a user can create and run multiple operating environments on a Host server at the same time. Each Virtual Machine requires its own guest operating system (GOS) and can run applications independently. The VMM software provides a layer between the computing, storage, and networking hardware and the software that runs on it.

Each VM acts as a separate execution environment, which reduces risk and allows developers to quickly re-create different operating system (OS) configurations or compare versions of applications designed for different OS's for as long as the integrity of data used by each of the VMs is provided. Generally, a Virtual Machine is an environment that is launched on a particular processor (a client machine) that is running a host operating system (HOS) and the VM runs the Guest OS.

Collecting task execution statistics by a Task Manager (in Windows) is performed in order to optimize system resource utilization. Typically, a user wants to know which tasks take up a lot of CPU time. However, when the tasks are executed within a VM, it is difficult to determine from the outside which particular task occupies CPU resources.

The Host system can only see that the VM execution takes a certain amount of CPU time, but it cannot determine which VM processes (tasks) individually take CPU time. For example, the VM can run a number of applications (e.g., MS WORD, MS EXCEL, Internet Explorer), but the exact percentage of CPU time used by each application is not known to the host OS Task Manager. The only way to collect execution statistics of the VM processes is to create a virtual Task Manager that runs under the Guest OS and monitors the processes and resource usage within the VM. However, there are no existing means for reflecting the VM execution statistics collected by the Guest Task Manager into the Host system Task Manager so the Host Task Manager provides aggregated Guest and Host statistics to the user.

Accordingly, there is a need in the art for a system and method for collecting Guest OS statistics by the host OS Task Manager.

SUMMARY OF THE INVENTION

The present invention is directed to virtualization technology and, more particularly to a system and method for collecting VM processes (Guest OS execution statistics) by the host OS Task Manager that substantially obviates one or several of the disadvantages of the related art.

In one aspect, there is provided a system, method and computer program product for implementing a VM on a Host computer and monitoring the VM processes from the Host computer. A Host-based Task Manager monitors the VM process and obtains execution statistics using a proprietary dynamic link library that substitutes standard statistic collection functions (provided by standard MS dynamic link libraries) by Guest statistic collection functions. The Guest statistic collection functions can acquire data related to execution of the VM processes running on the Guest OS.

Additional features and advantages of the invention will be set forth in the description that follows. Yet further features and advantages will be apparent to a person skilled in the art based on the description set forth herein or may be learned by practice of the invention.

The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

According to the exemplary embodiment, a system, method and computer program product for monitoring the VM processes from the Host computer and collecting execution statistics are provided. A Host-based Task Manager (or Activity Monitor, for Mac OS, or similar for other operating systems) monitors the VM process and obtains execution statistics using a proprietary dynamic link library that substitutes standard statistic collection functions with Guest statistic collection functions. The Guest statistic collection functions can acquire data related to execution of the VM processes running on the Guest OS.

According to the exemplary embodiment, the standard dynamic link library "win32.dll" (provided by MS WINDOWS™) is substituted by a proprietary DLL that is camouflaged as an original "win32.dll" and placed in the same location on the system. The Task Manager uses functions such as win32.dll or task32.dll that obtain execution statistics, as well as other functions. The statistics functions of the "win32.dll" cannot normally access the processes running under the Guest OS of the VM. Therefore, the proprietary DLL, in accordance with the exemplary embodiment, has additional Guest statistics functions.

The Task Manager interacts with the proprietary DLL in the same manner as is does with the standard "win32.dll." The proprietary DLL is injected between the Task Manager and the "win32.dll," so the Task Manager gets the Host process statistics using the "win32.dll" (which is located in its usual directory, for example, c:/windows/system32), and the Guest process statistics using the proprietary DLL, which is located in the Task Manager directory. Since the normal order of lookup of a DLL is (1) in the process' own directory, (2) in root directory, and (3) in c:/windows/system32 directory, the proprietary DLL located in the Task Manager directory, will be activated first.

It interfaces to the tools in the Guest OS's in the VM's, to collect statistics about guest processes. The Proprietary version of win32.dll replaces the standard one during Guest OS tools installation. Guest Tools is a technique used by virtualization products to integrate guest OS with host OS. A typical way to install guest OS tools is using autorun setup package mounted with tools CD image to the VM. Then, control is redirected to the standard win32.dll in c:/windows/system32, to collect statistics about the host processes.

The process information for both host and guest processes can then be displayed in an integrated manner, for example, in a hierarchical tree display, with processes under each VM shown as a tree structure under that particular VM's vmapp.exe (the VM's own executable). Note that this can be applied to different Guest OSs, for example, some of the Guest OSs can be WINDOWS, and others Mac OS. A typical Linux "top" console utility can show statistics about guest OS processes simultaneously with host OS ones.

Figure 1:
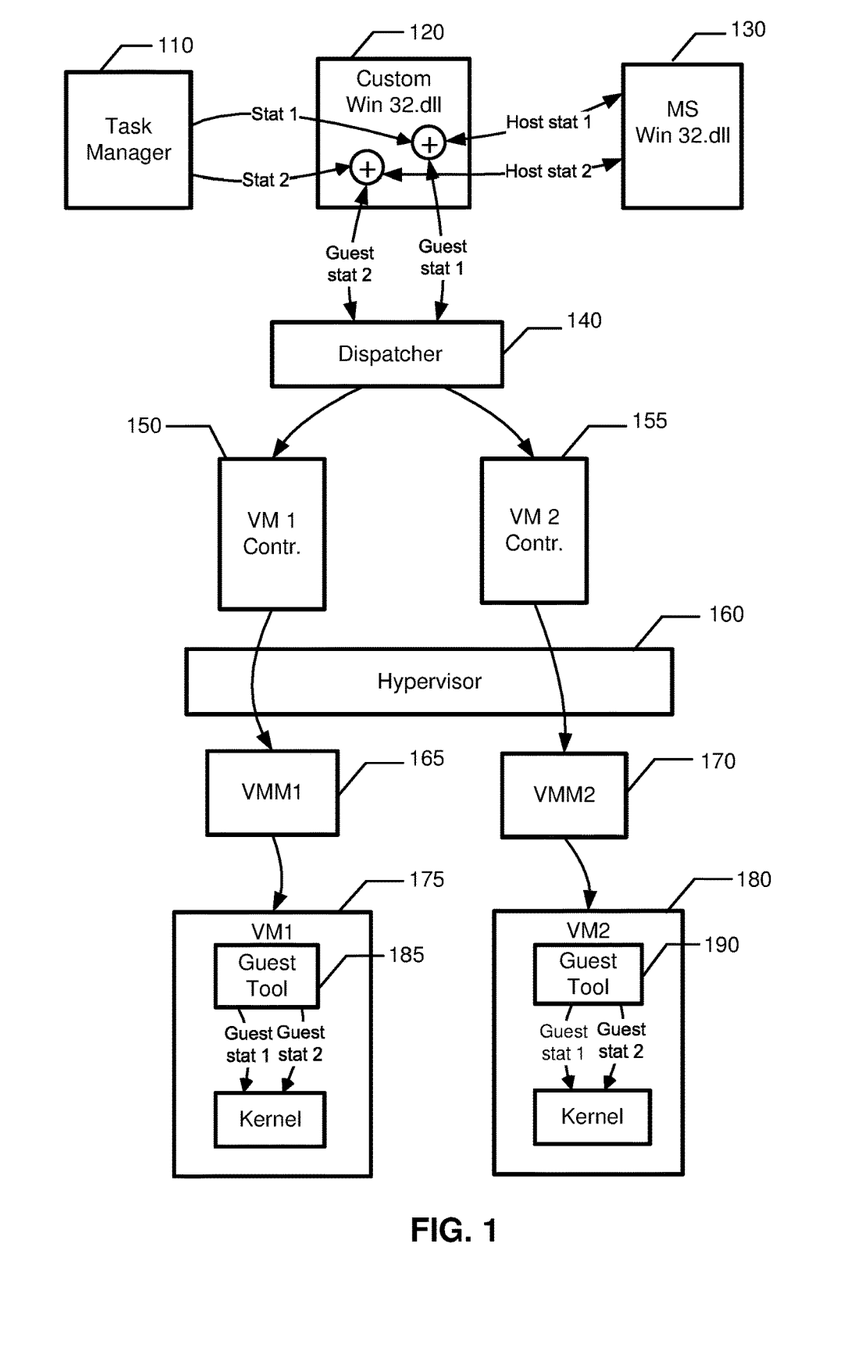
FIG. 1 illustrates a system for obtaining Guest OS statistics, in accordance with the exemplary embodiment.

FIG. 1 illustrates a system for obtaining the Guest OS statistics in accordance with the exemplary embodiment. A Host-based Task Manager (or activity monitor) 110 uses a proprietary DLL 120 located at the same place as MS "win32.dll" 130 and substitutes it. The main functionality of the "win32.dll" 130 is duplicated in the DLL 120. However, the DLL 120 has statistics functions (stat1 and stat2) for collecting execution statistics from VMs 175 and 180. Note that an arbitrary number of VMs can be monitored. The standard Task Manager can be used.

According to the exemplary embodiment, the proprietary DLL 120 communicates with a dispatcher module 140 that accesses VMs 175 and 180. The VMs 175 and 180 have corresponding Guest processes 185 and 190 running on them. The dispatcher module 140 accesses the VM processes 185 and 190 via VM controllers 150 and 155 communicating with Virtual Machine Monitors 165 and 170 via hypervisor 160. Note that the controllers 150 and 155 can work with the Parallels VM (MAC OS X) and Parallels VM (Windows), respectively, illustrated in the exemplary snapshot in FIG. 2.

Virtualization technique based on Hypervisor and VMM architecture is a mechanism to create a virtual environment and a nested set of guest OS processes. The mechanism also provides a communication transport between guest statistics Win32.dll (120) and guest OS tools (185 and 190) running inside virtual environment and collecting information about guest OS processes.

Hypervisor (or Hypervisor+VMM)—based virtualization techniques is for exemplary purposes only. PARALLELS Container based technology can also be also used to create virtual environments to launch nested guest/virtualized processes and to organize communication transport between Guest OS tools and guest statistics collecting dynamic library, providing for host OS process profiling tool data about guest processes.

Thus, the Task Manager 110 implemented on the host advantageously acquires execution statistics for Host processes as well as for Guest processes 185 and 190, while the standard Task Manager does not need to be modified. An MS Process Explorer can be used instead of the Task Manager. A similar concept is applicable to Mac OS Activity Monitor and other similar utilities in other OSs, which show applications, processes, system services use, performance statistics, users, networking, and so on.

Backward manipulation on guest processes (stop, set affinity, etc.) is also possible, to capture correspondent actions in host OS, and to transmit commands to guest OS tools. The Guest Tools receive manipulation commands and perform correspondent actions on the Guest OS processes inside a virtual environment. A centralized mechanism is provided to view, analyze and manipulate host and guest OSs' processes. The mechanism integrates entire host and guest OS statistics inside the same host OS API functions.

Figure 2:
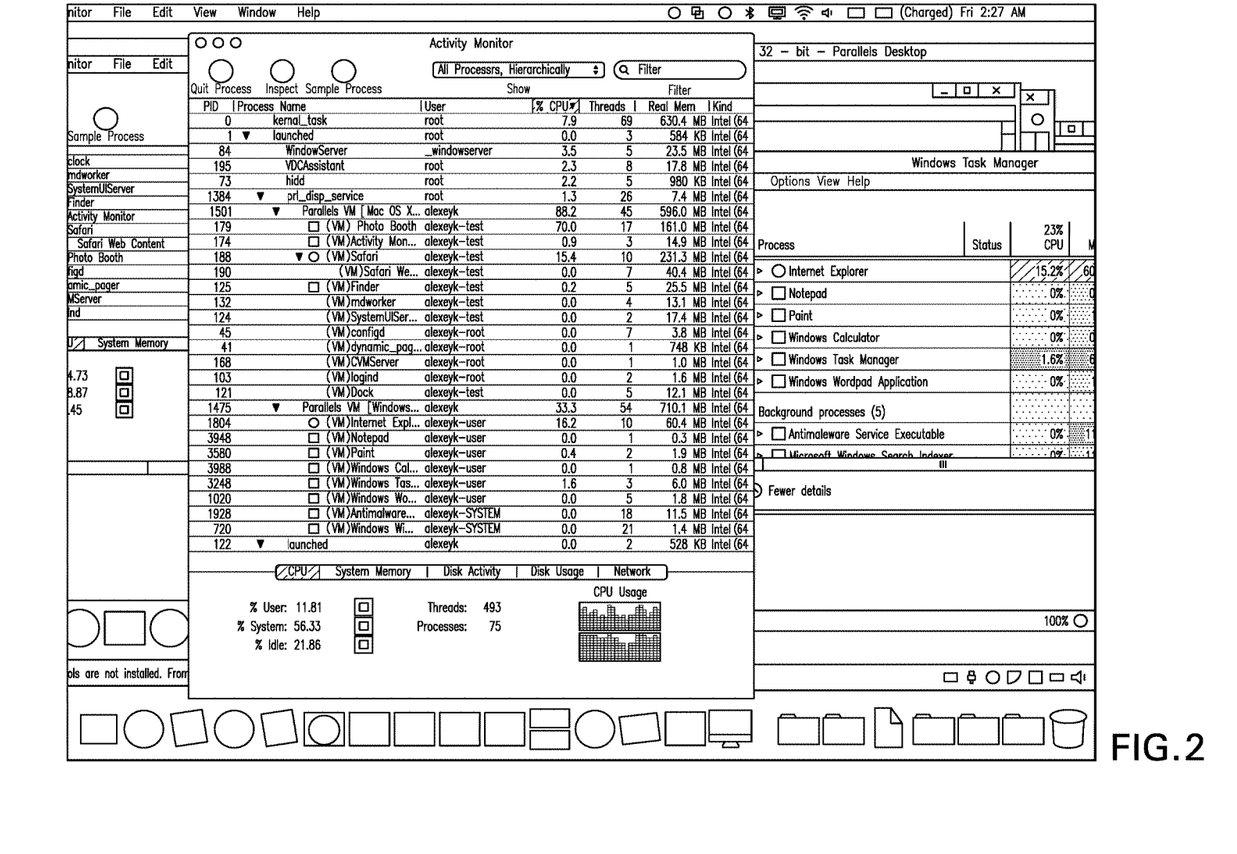
FIG. 2 illustrates a screenshot, in accordance with the exemplary embodiment.

FIG. 2 illustrates a screenshot, in accordance with the exemplary embodiment, showing the hierarchical tree structure. In this figure, there are two running VMs with their Guest OS's Mac OS X Lion and Windows 8.1. Each VM has the host processes controlling the execution of the VM. The processes are shown in the screenshot, with their corresponding processes with process identifiers (PID) 1501 and 1478 in the host Mac OS X Activity Monitor. The VMs are implemented in contexts of these processes.

A tool inside the guest OS collects statistics and counters about processes running inside VM and transfers it to a hook library 120 (FIG. 1) running in host OS. The Host Activity Monitor gets information about processes by using a standard host API, with the hook code injected. The hook code processes API calls (from any host tool, and not only the Activity Monitor), reports host process statistics and adds information about guest OS processes running inside the VMs.

Guest OS processes (running inside VMs) are reported with parent processes identifiers pointing to host processes controlled VM execution (i.e., 1501 and 1478 in the screenshot). Thus, the Activity Monitor shows hierarchy of host and guest processes (in this example, guest processes names started with "(VM)" prefix).

Figure 3:
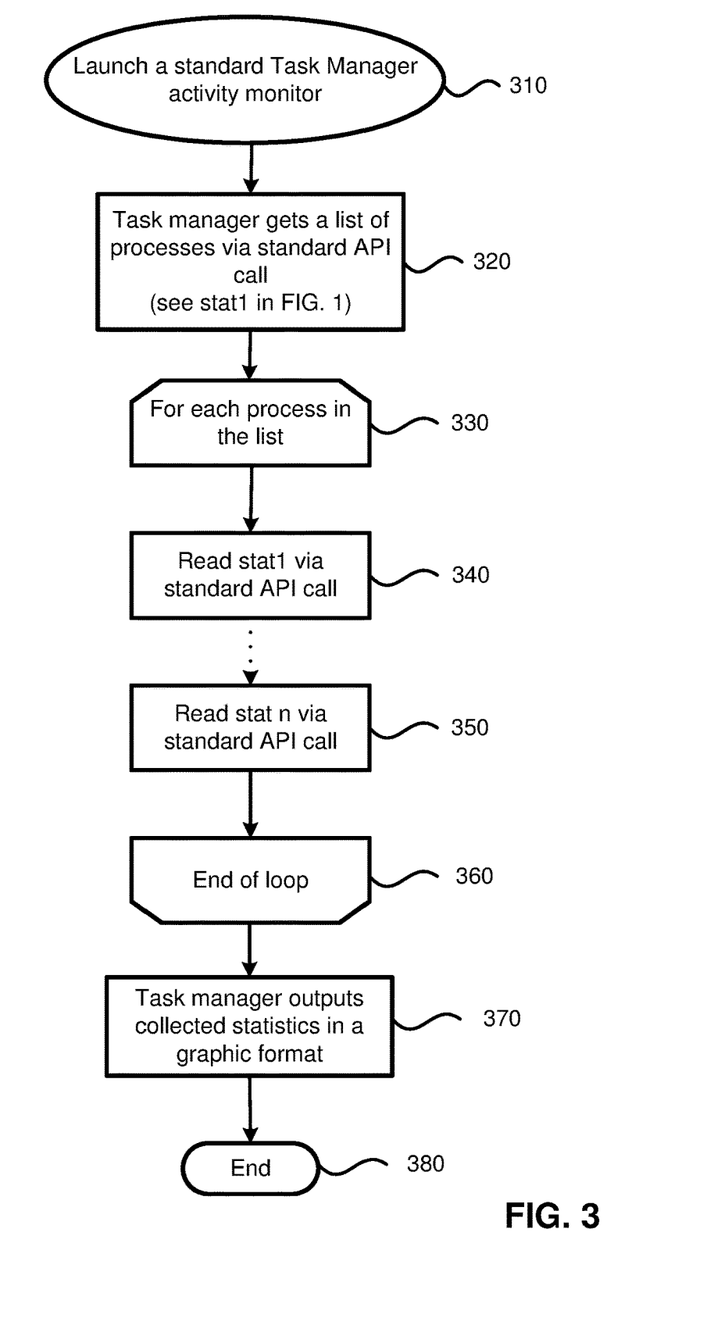
FIG. 3 illustrates a flow chart of a method for collecting execution statistics in accordance with the exemplary embodiment.

FIG. 3 illustrates a flow chart of a method for collecting execution statistics in accordance with the exemplary embodiment. In step 310, the process launches a Task Manager Activity Monitor. In step 320, the Task Manager acquires a list of processes via a standard API call (see stat 1 in FIG. 1). In step 330, the process initiates a loop (from 1 to n) for each process in the list. In step 340, the Task Manager reads the stat 1 values via a standard API call. In step 350, the Task Manager reads the stat n values via a standard API calls. The statistic acquisition loop is completed in step 360. In step 370, the Task Manager outputs the collected statistics in a graphic form. The process ends in step 380. Note that the Task Manager displays the VM names as shown in FIG. 2.

Figure 4:
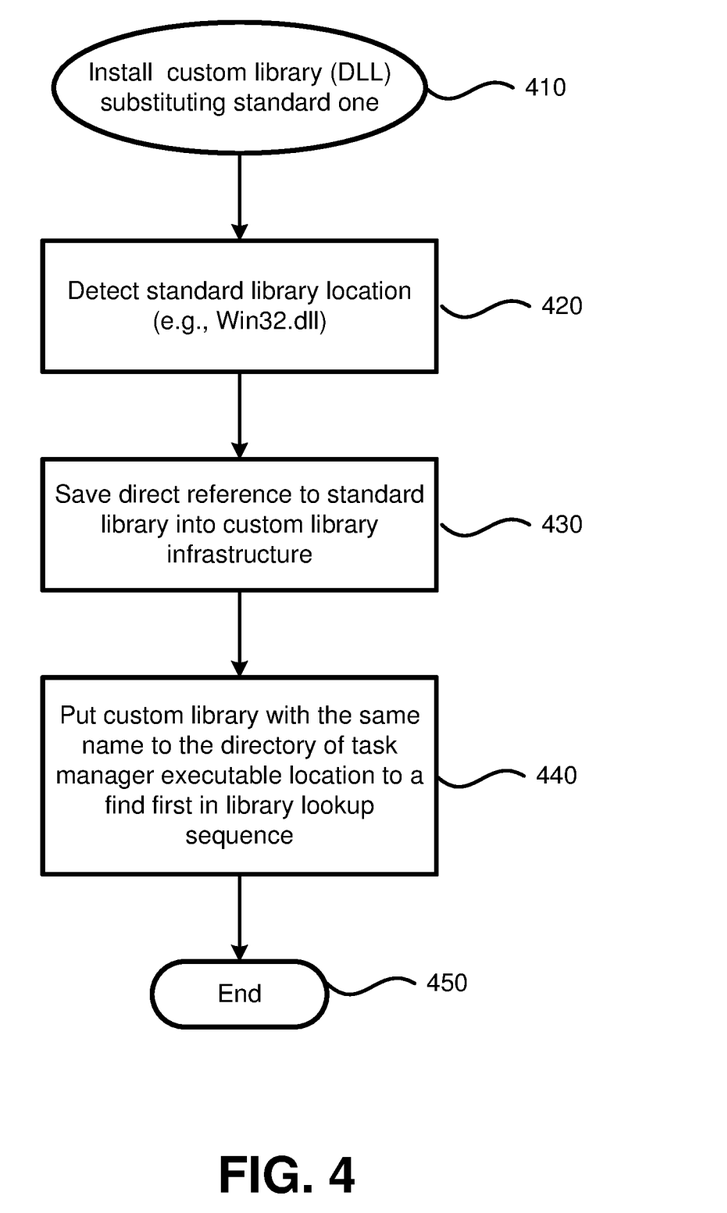
FIG. 4 illustrates a flow chart for a method for substituting a standard dynamic library for collecting the Guest OS statistics.

FIG. 4 illustrates a flow chart for a method for substituting a standard dynamic library for collecting the Guest OS statistics. In step 410, a custom dynamic link library (DLL) is installed to replace a standard DLL. In step 420, the process detects a standard DLL location (e.g., a location of Win32.dll). The process saves a direct link to a standard DLL into the custom DLL in step 430. The process places the custom DLL into a standard Task Manager location, in step 440, so the Task Manager finds this DLL first in his look up sequence. The process ends in step 450.

Figure 5:
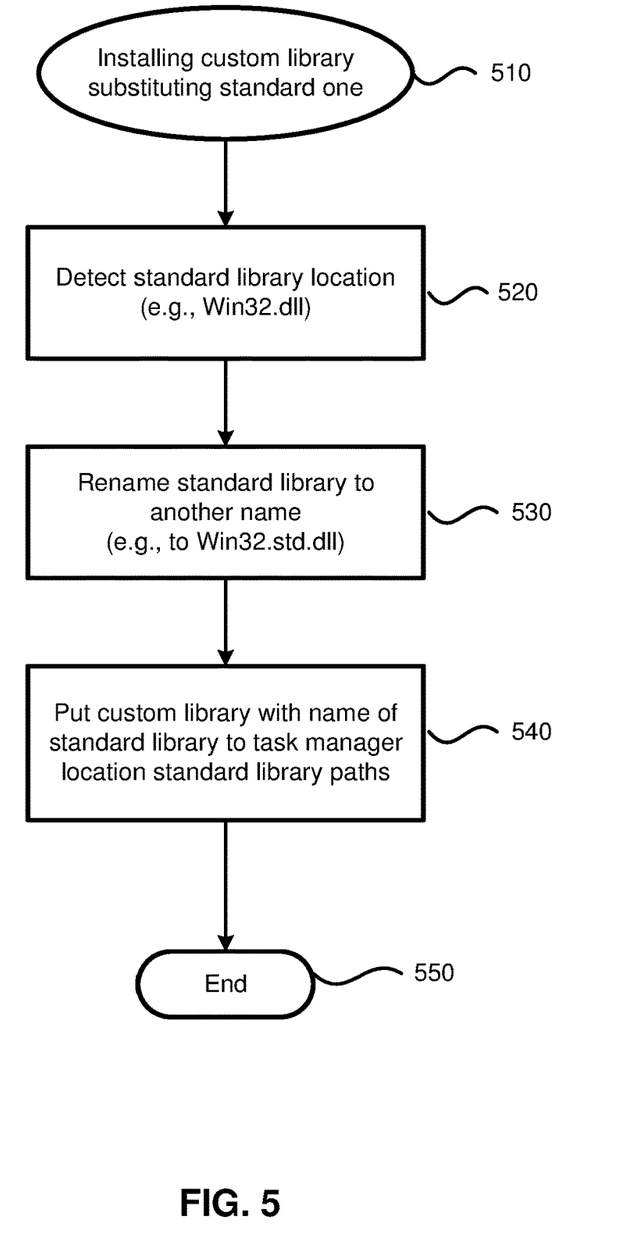
FIG. 5 illustrates a flow chart for another method for substituting a standard dynamic library for collecting the Guest OS statistics.

FIG. 5 illustrates a flow chart for another method for substituting a standard dynamic library for collecting the Guest OS statistics. In step 510, a custom dynamic link library (DLL) is installed to replace a standard DLL. In step 520, the process detects a standard DLL location (e.g., a location of Win32.dll). The process renames a standard DLL (e.g., Win32.std.dll) in step 530. The process places the custom DLL with the name of the standard DLL into a standard Task Manager location path, in step 540. Thus, the Task Manager "sees" this DLL as a standard DLL. The process ends in step 550.

Figure 6:
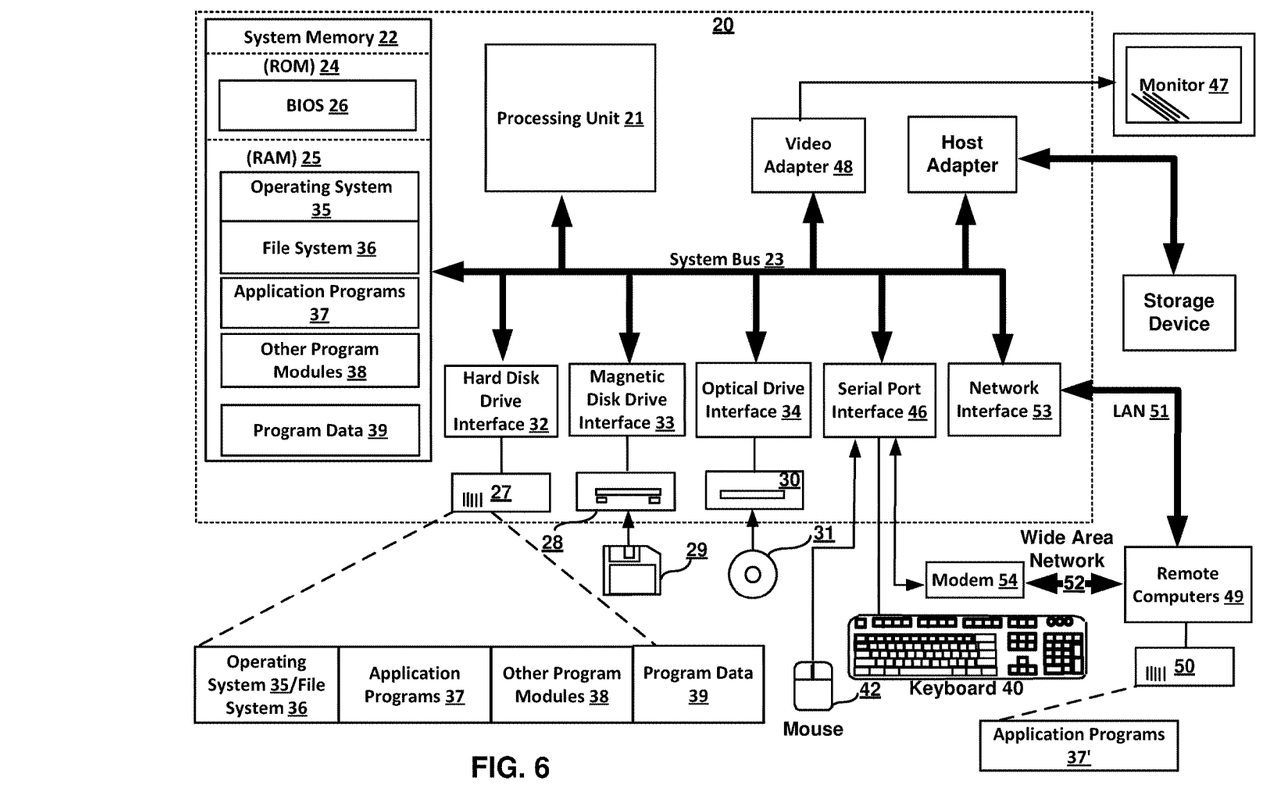
FIG. 6 illustrates an exemplary computer system where the embodiments described herein can be implemented.

With reference to FIG. 6, an exemplary system for implementing the invention includes a general purpose computing device in the form of a host computer 20 or the like, including a processing unit (single core or multi-core) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer/server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 120.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A computer-implemented method for acquiring process statistics, the method comprising:
  starting a Virtual Machine (VM) on the host node;
  renaming a standard dynamic link library (DLL) that collects process statistics;
  installing a replacement DLL in a directory of a Task Manager of the host node and running outside the VM, wherein the replacement DLL has the same name as the standard DLL prior to the renaming;

collecting host OS process statistics of processes of the host node running outside the VM via the renamed standard DLL;

collecting VM process statistics of processes running inside of the VM via API calls to the replacement DLL from the Task Manager; and displaying the VM process statistics and the host OS process statistics in the same interface of the Task Manager.

2. The method of claim 1, further comprising launching the Task Manager on a host node.

3. The method of claim 1, further comprising saving a link to a location of the renamed standard DLL prior to the installing step.

4. The method of claim 1, further comprising starting a host process prior to the step of collecting the host OS process statistics.

5. The method of claim 1, further comprising starting a VM process on the VM prior to the step of collecting the VM process statistics.

6. The method of claim 1, further comprising detecting a location of the renamed standard DLL.

7. The method of claim 1, wherein the interface is a hierarchical tree, and wherein all VM processes are grouped in the hierarchical tree.

8. The method of claim 1, wherein the standard DLL, prior to renaming, is WIN32.DLL.

9. The method of claim 1, wherein the replacement DLL is injected between the Task Manager and the standard DLL.

10. The method of claim 1, wherein the replacement DLL interfaces to tools in the VM to collect the VM process statistics.

11. The method of claim 1, wherein the VM processes are displayed with identifiers of parent host processes.

12. A non-transitory computer readable medium comprising a computer program logic stored on the medium for executing a computer-implemented method for acquiring process statistics, the method comprising:

starting a Virtual Machine (VM) on the host node;

renaming a standard dynamic link library (DLL) that collects process statistics;

installing a replacement DLL in a directory of a Task Manager of the host node and running outside the VM, wherein the replacement DLL has the same name as the standard DLL prior to the renaming;

collecting host OS process statistics of processes of the host node running outside the VM via the renamed standard DLL;

collecting VM process statistics of processes running inside of the VM via API calls to the replacement DLL from the Task Manager; and displaying the VM process statistics and the host OS process statistics in the same interface of the Task Manager.

13. A system for acquiring process statistics, the system comprising:

a plurality of Virtual Machines (VMs) running on a processor of a host node;

a Task Manager running on the host node and outside the VMs;

a replacement dynamic link library (DLL) that collects VM process statistics, and is installed in a directory of the Task Manager;

a renamed standard DLL, wherein the replacement DLL has the same name as the standard DLL prior to the renaming;

host OS process statistics of host OS processes collected via the renamed standard DLL, wherein the host OS processes are executing outside the VMs;

VM process statistics of processes running inside the VMs collected from the VMs via API calls from the Task Manager in the replacement DLL; and a unified interface displaying the VM process statistics and the host OS process statistics in the Task Manager.

14. The system of claim 13, wherein the custom DLL interfaces to tools in the VMs through a dispatcher module.

15. The system of claim 14, wherein the tools collect data about counters for the VM processes and transmit it to the custom DLL.

16. The system of claim 13, wherein the VM processes are displayed with identifiers of parent host processes.

17. The system of claim 13, wherein the interface is a hierarchical tree, and wherein processes of each VM are grouped in the hierarchical tree.

18. The system of claim 13, wherein the standard DLL, prior to renaming, is WIN32.DLL.

* * * * *